Figure 1:
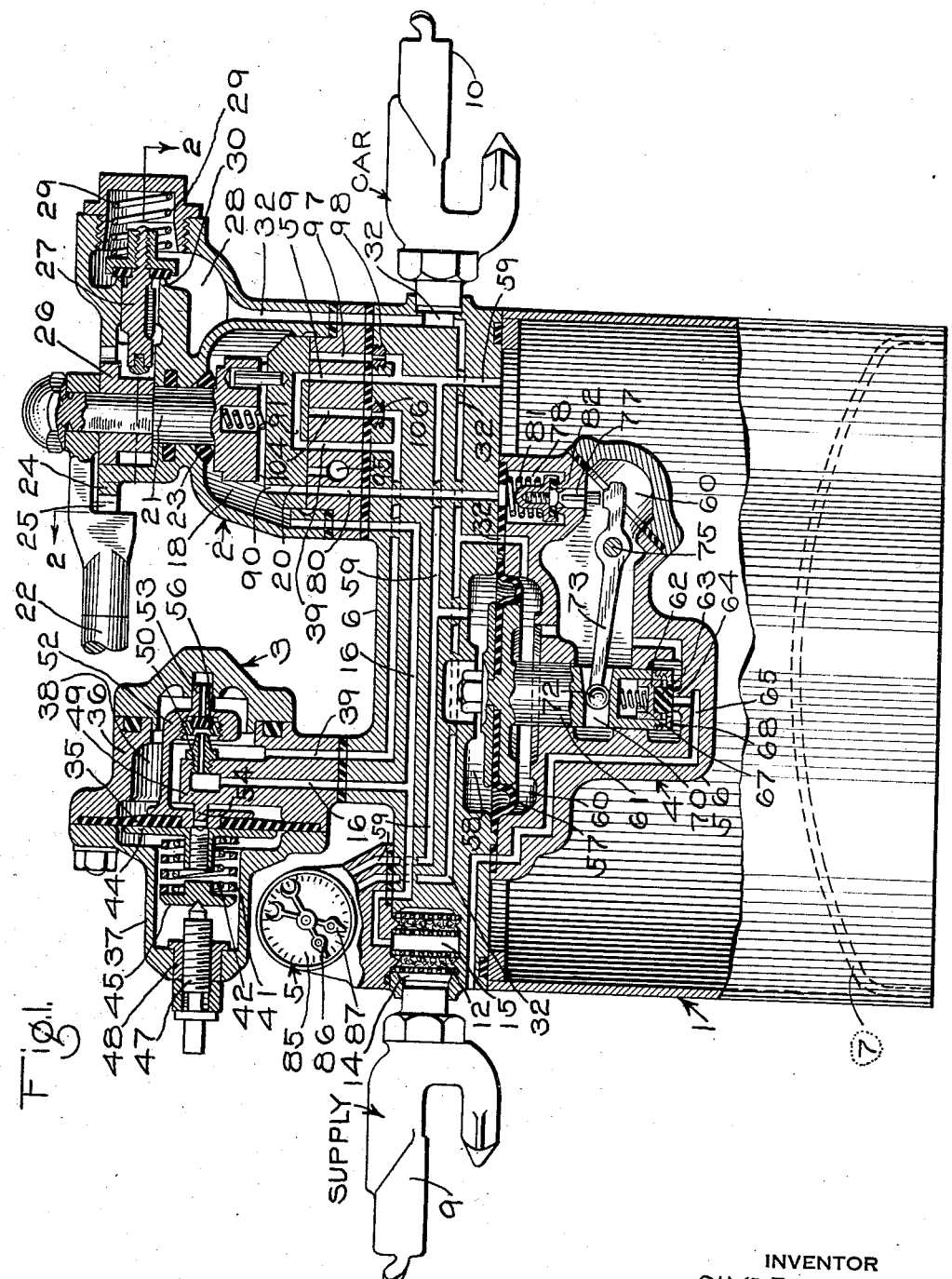

Oct. 24, 1939.  C. C. FARMER  2,177,520
TESTING DEVICE
Filed Aug. 19, 1937   2 Sheets-Sheet 1

INVENTOR
CLYDE C. FARMER
BY  Wm. M. Cady
ATTORNEY

Oct. 24, 1939.  C. C. FARMER  2,177,520
TESTING DEVICE
Filed Aug. 19, 1937   2 Sheets-Sheet 2
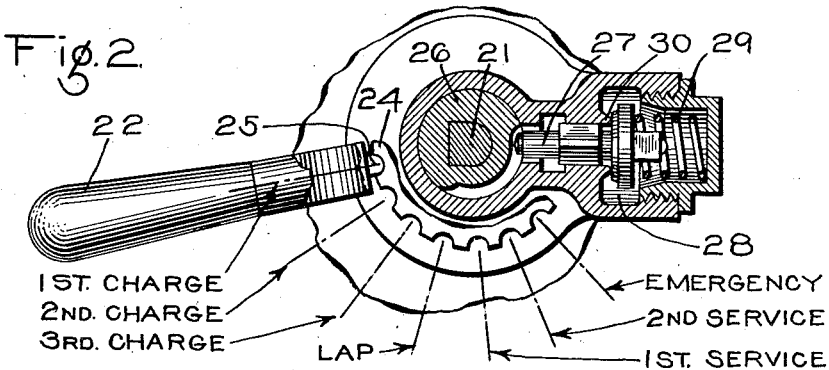
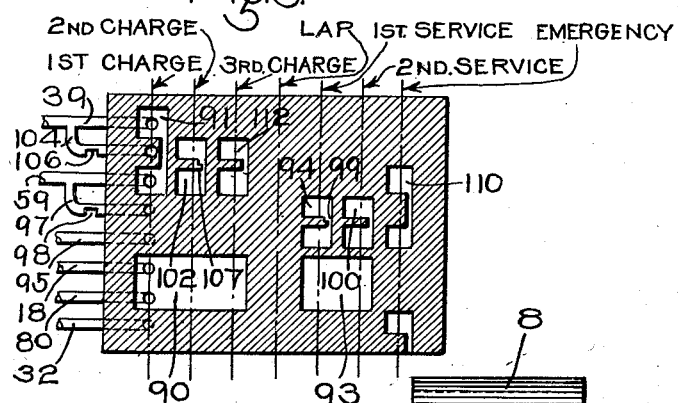
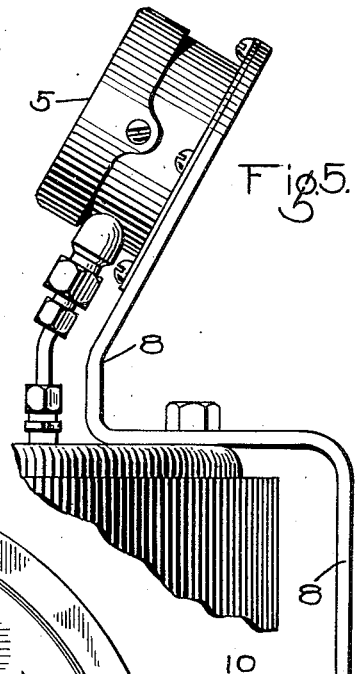
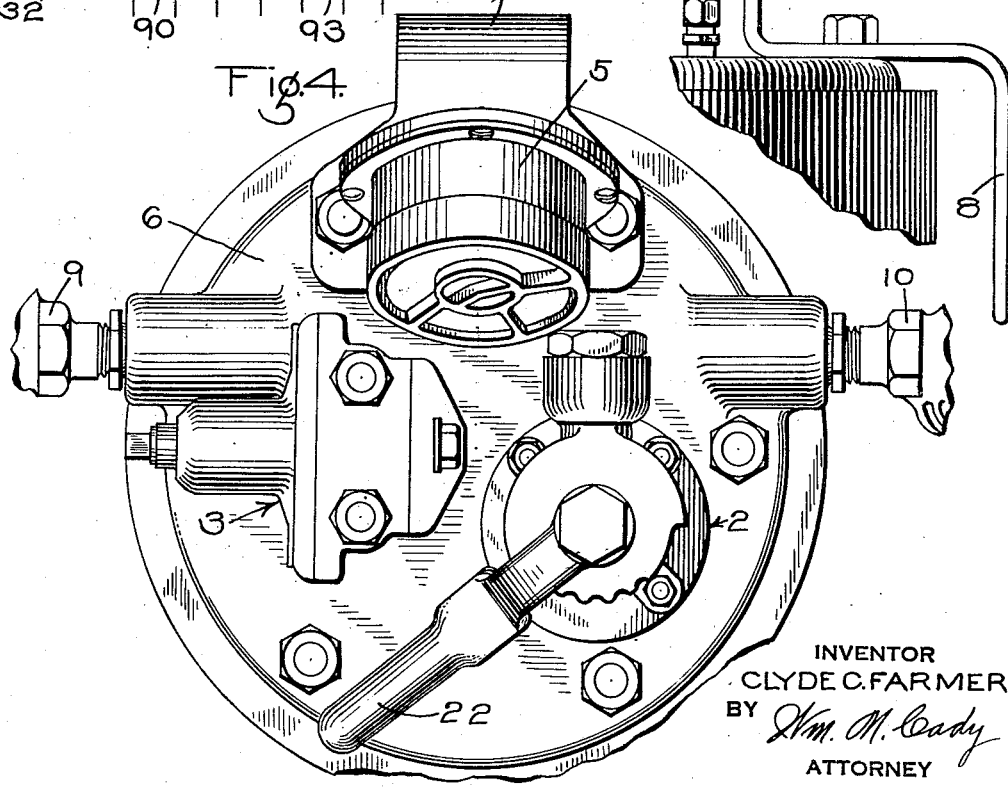
INVENTOR
CLYDE C. FARMER
BY *Wm. N. Cady*
ATTORNEY Patented Oct. 24, 1939

2,177,520

UNITED STATES PATENT OFFICE 2,177,520

TESTING DEVICE

Clyde C. Farmer, Pittsburgh, Pa., assignor to The Westinghouse Air Brake Company, Wilmerding, Pa., a corporation of Pennsylvania Application August 19, 1937, Serial No. 159,846

8 Claims. (Cl. 73—51)

This invention relates to a testing device and particularly to improved means for determining the condition of fluid pressure brake equipments employed on railway vehicles.

It has heretofore been proposed to provide a portable testing device by means of which the condition of the brake equipment on a car situated in a railroad yard may be quickly determined without removing any of the brake equipment from the car. This testing device is commonly referred to as a single car testing device, and includes means adapted to be connected to a suitable source of fluid under pressure, such as a yard line in a railroad yard, and to the brake pipe on a car, the brake equipment of which is to be tested.

The testing device heretofore provided includes valve means for controlling the flow of fluid under pressure through ports of predetermined size from the source of supply to the brake equipment being tested, and to also control the release of fluid under pressure at different rates through ports of predetermined size from the brake equipment on the car being tested. This test device includes, in addition, a gauge to indicate the pressure of the fluid in the brake pipe to enable the operator to ascertain the time required to effect a predetermined change in the brake pipe pressure, or to ascertain the change which occurs in a predetermined time.

However, the cars which are now in use vary greatly in length, and there is a corresponding variation in the length and volume of the brake pipe on these cars, and a similar variation in the change which takes place in brake pipe pressure on the supply of fluid under pressure to or the release of fluid under pressure from the brake pipe on different types of cars through an orifice of predetermined size. A portable testing device is employed to test all types of cars, and it has been found that if the test requirements are made rigid enough to properly test and to condemn the defective triple valves in the brake equipment on cars with relatively small brake pipe volume, the tests are too severe for the brake equipment on cars with relatively large brake pipe volume and will result in the condemnation of triple valves which in fact are not defective.

Similarly, if the tests are made lax enough to not improperly condemn the triple valves on cars with relatively large brake pipe volume, they do not satisfactorily indicate the condition of the triple valves on cars with relatively small brake pipe volume, and will pass or indicate as satisfactory triple valves which are in fact defective and should be removed and repaired.

It is an object of this invention to provide an improved portable testing device which will indicate quickly and accurately the condition of the brake equipment on a car, irrespective of the volume of the brake pipe on the car.

Another object of the invention is to provide an improved portable testing device which is adapted to be employed to determine the condition of the brake equipment on diverse types of cars, and which is arranged to provide uniform, accurate information regarding the condition of the equipment on these cars regardless of differences in the volume of the brake pipe thereon.

A further object of the invention is to provide an improved portable testing device which will supply uniform, accurate information regarding the condition of the brake equipment on a car regardless of variations in the pressure of the ffuid furnished the testing device.

Another object of the invention is to provide an improved portable testing device of the type described which is simple and compact in construction, and which is light in weight so that it can be readily carried by a workman.

A further object of the invention is to provide an improved portable testing device of the type described which is of rugged construction, and which will operate throughout long periods of time to provide accurate information regarding the condition of the brake equipments which are tested.

Other objects of the invention and features of novelty will be apparent from the following description taken in connection with accompanying drawings, in which Fig. 1 is a diagrammatic view, largely in section, of a testing device provided by my invention, Fig. 2 is a fragmentary elevational view of the brake valve device employed in the testing device shown in Fig. 1, Fig. 3 is a diagram of the ports in the rotary valve of the brake valve device employed in the testing device shown in Fig. 1, Fig. 4 is a partial top plan view of the testing device provided by this invention and showing the device as it is actually constructed, and Fig. 5 is a fragmentary elevational view of the testing device shown in Fig. 1 and showing the handle by which the device may be carried.

Referring to the drawings, and particularly to Fig. 1 thereof, the testing device provided by this invention comprises a volume or control reservoir 1, a brake valve device 2, a feed valve device 3, an equalizing valve device 4, and a duplex gauge 5. The volume or control reservoir 1 may be of any suitable well known contruction, and as shown comprises a cylindrical sheet metal shell open at its upper end, while a head 6 formed of any suitable material, such as cast metal, is mounted over the open end of the sheet metal shell and is secured in position by suitable means, not shown.

The bottom of the reservoir 1 is closed by means of a curved head 7 having its concave face at the exterior of the reservoir so that the bottom of the reservoir has a narrow annular surface which is adapted to rest firmly upon rough ground such as is usually found in railroad yards.

The head 6 serves not only to close the end of the reservoir 1, but also as a support for the other portions of the testing device, while a suitable handle 8, as shown in Figs. 4 and 5, is secured to the head 6 and provides means by which the testing device may be carried by a workman, while it also provides a support for the gauge 5.

The head 6 has secured thereto a coupling 9 which is adapted to be coupled to a counterpart coupling associated with a source of fluid under pressure, such as the yard line in a railroad yard, while the head 6 also has secured thereto a similar coupling 10 which is adapted to be coupled to a counterpart coupling on the flexible hose at an end of the brake pipe on a car, the brake equipment of which is to be tested.

The head 6 has a chamber formed therein in which is mounted an air straining element indicated generally by the reference numeral 12, and which may be of the type shown in U. S. Patent No. 2,014,895, issued September 17, 1935 to Ellis E. Hewitt. As shown in Fig. 1, the air straining element 12 is clamped between confronting annular ribs on the head 6 and on a member to which is secured the duplex gauge 5.

As shown, the air straining element 12 comprises foraminous tubular members of substantially different diameters. The smaller of these members is mounted within the larger, while suitable air straining material, such as curled hair, is packed in the space between the tubular members.

The area or chamber 14 outwardly of the air straining element 12 is open to the passage in the coupling 9, while the area or chamber 15 within the inner of the tubular members of the air straining element 12 is open to a supply passage 16 formed in the head 6.

The brake valve device 2 is of a well known construction and comprises a body having a valve chamber 18 therein in which is mounted a rotary valve 20, which is operated by means of a shaft 21 which extends through an opening in the wall of the chamber 18 and has secured thereon a handle 22 by means of which the shaft 21 and the rotary valve 20 may be turned. The valve chamber 18 has connected thereto a branch of the supply passage 16, while the opening through which the shaft 21 extends is sealed by means of suitable packing indicated at 23.

The body of the brake valve device 2 has associated therewith a quadrant 24 having a series of notches formed in the periphery thereof, as is best shown in Fig. 2, while the handle 22 carries a spring pressed plunger 25 which extends into the notches in the quadrant 24 to define the different operating positions of the handle 22 and the rotary valve 20.

The shaft 21 has mounted thereon a cam element 26 having a cam surface adapted to engage at certain times, as will hereinafter more fully appear, the end of the stem of a poppet valve 27 which is mounted in a chamber 28 formed in the body of the brake valve device 2. A coil spring 29 is mounted in the chamber 28 and yieldingly presses the valve 27 into engagement with a seat rib 30 surrounding a passage open to the atmosphere, while the chamber 28 has connected thereto a branch of the brake pipe passage 32, which is formed in the head 6 and which is open to the passage in the coupling 10.

The feed valve device 3 comprises a movable abutment in the form of a flexible diaphragm 35 which is clamped between confronting flanges on a body 36 and a cover 37. The diaphragm 35 is subject on one side to the pressure of the fluid in a chamber 38 which is constantly connected by way of a passage 39 with a port in the seat of the rotary valve 20 of the brake valve device 2. The diaphragm 35 is subject on the other side to the force exerted by coil springs 41 and 42 which extend between a follower 44 and one face of a spring seat 45. The other face of the spring seat 45 has a centrally disposed recess therein into which extends the conical tip of an adjusting screw 47 having threaded engagement with a bushing 48 associated with the cover 37.

The body 36 has formed integral therewith a projecting portion 49 which extends into the chamber 38, while this portion has therein a branch of the supply passage 16. A choke plug 50 is secured in the portion 49 substantially at the axis of the diaphragm 35, and this plug has a port therein through which fluid under pressure may flow from the supply passage 16 to the chamber 38, while the end of the plug 50 within the chamber 38 has a seat rib thereon surrounding the passage therethrough.

The port through the choke plug 50 is large enough to enable fluid under pressure to flow therethrough from the supply passage 16 to the chamber 38 at least as rapidly as fluid under pressure is supplied from the chamber 38 through ports controlled by the brake valve device 2 as will be hereinafter more fully explained.

The diaphragm 35 has secured thereto a stem 52 which has at one end a projection 53 which is slidably mounted in and guided by a bore in a section of the body of the feed valve device, while the other end of the stem 52 has a bore therein which is adapted to receive a projection 54 formed on the projecting portion 49 of the body of the feed valve device to guide the end of the stem 52 adjacent the diaphragm 35.

The stem 52 carries a sealing gasket 56 formed of suitable resilient material, such as molded rubber composition, which is adapted at certain times to engage the seat rib on the choke plug 50 to cut off the flow of fluid under pressure through the port in the choke plug.

In operation, the springs 41 and 42 of the feed valve device 3 exert force on the flexible diaphragm 35 to move the diaphragm and the stem 52 to the right, as viewed in the drawings, and thus move the sealing gasket 56 away from the seat rib on the choke plug 50 to permit fluid under pressure supplied to the supply passage 16 to flow through the port in the choke plug to the chamber 38. On an increase in the pressure of the fluid in the chamber 38, force is exerted upon the diaphragm 35 in opposition to the springs 41 and 42, and when the pressure of the fluid in the chamber 38 has built up to a predetermined value, the diaphragm 35 will be moved against the springs 41 and 42 to permit the sealing gasket 56 carried by the stem 52 to seat upon the seat rib on the choke plug 50 to cut off the further supply of fluid under pressure through the port in the choke plug 50 to the chamber 38.

The adjusting screw 47 of the feed valve device 3 is adjusted so that the force exerted by the springs 41 and 42 on the diaphragm 35 is such that the diaphragm will be moved by the fluid under pressure in the chamber 38 against the springs 41 and 42 far enough to permit the sealing gasket 56 to seat upon the seat rib on the choke plug 50 to cut off the further supply of fluid under pressure to the chamber 38 through the port in the choke plug when the pressure of the fluid in the chamber 38 has increased to a predetermined value, such as seventy pounds to the square inch, which is the pressure normally employed in the fluid pressure brake equipment on railway vehicles.

The equalizing valve device 4 comprises a movable abutment in the form of a flexible diaphragm 57 which is clamped between the body of the equalizing valve device and the head 6. The diaphragm 57 has at one face thereof a chamber 58 which is constantly connected by way of a passage 59 formed in the head 6 with the chamber within the reservoir 1, while a branch of the passage 59 leads to a port in the seat of the rotary valve 20 of the brake valve device 2. The diaphragm 57 has at the other face thereof a chamber 60 to which is connected a branch of the brake pipe passage 32 so that the diaphragm 57 is subject to the opposing pressures of the fluid in the brake passage 32 and of the fluid in the control reservoir 1.

The diaphragm 57 has secured thereto a stem 61 which is slidable in a bore in the body of the equalizing valve device, while this stem has in the end thereof remote from the diaphragm 57 a bore in which is mounted a valve 62. The valve 62 has associated therewith a sealing gasket 63 formed of suitable resilient material, such as molded rubber composition, and adapted at certain times to engage a seat rib 64 formed on the body of the valve device surrounding the end of an exhaust passage 65 formed in the body and in the head 6. A coil spring 67 extends between the valve 62 and the end of the bore in the stem 61 in which the valve is mounted and yieldingly presses the valve 62 towards the end of this bore, while the valve is prevented from moving out of the bore by means of a retaining ring 68 secured on the end of the stem 61.

The stem 61 has a wedge shaped opening 70 extending therethrough, while the spherical end portion 72 of a lever 73 mounted in the chamber 60 extends into the opening 70. The lever 73 is supported on a pin 75 carried by the body of the valve device, while the other end of the lever 73 is adapted at certain times to engage the end of the stem of a valve 77. The pin 75 and the lever 73 are arranged so that the distance between the spherical end portion 72 and the pin 75 is substantially greater than the distance between the pin 75 and the portion of the lever engaged by the end of the valve 77. This multiplies the force exerted by the diaphragm 57 on the valve 77, and enables the diaphragm to operate to unseat the valve 77 in response to relatively small pressure differentials.

The valve 77 is mounted in a chamber 78 which is constantly connected by way of a passage 80 with a port in the seat of the rotary valve 20 of the brake valve device 2, and is yieldingly pressed by means of a coil spring 81 into engagement with a seat rib 82 surrounding the passage in which the fluted stem of the valve is mounted.

The duplex gauge 5 is of the usual well known construction, having a graduated dial 85 and pointers 86 and 87, which are adapted to be rotated around the dial 85.

The pointer 86 has associated therewith pressure responsive mechanism to which is connected a branch of the control reservoir passage 59 formed in the head 6 and leading from the chamber in the control reservoir 1 so that the pointer 86 indicates the pressure of the fluid present in the control reservoir 1.

Similarly, the pointer 87 has associated therewith pressure responsive mechanism to which is connected a branch of the brake pipe passage 32 formed in the head 6 so that the pointer 87 indicates the pressure of the fluid present in the brake pipe passage 32.

It will be seen that the testing apparatus provided by this invention is of simple and rugged construction having a small sheet metal control reservoir which is light in weight, while one end of this reservoir is closed by a rigid head member 6 which also serves as a support or mounting piece for the valve devices and gauges employed in the testing device, in addition to having the couplings secured thereto, while the handle by which the testing device is carried is secured to the head 6.

Furthermore, the head 6 has formed therein the passages connecting the various parts of the test device, thereby eliminating all pipe connections, except those leading to the duplex gauge 5, and which might become loosened and develop leaks which would impair the accuracy of the tests carried out with the device.

*Operation of the testing device in testing a brake equipment*

The testing device provided by this invention is adapted to be employed to test different types of brake equipments employed on freight and passenger cars. The brake equipment most widely used at the present time is that for freight cars, and employs a "K" type triple valve and the method of testing an equipment of this type by means of the testing device provided by this invention will be first described.

In operation, when it is desired to test the brake equipment on a railway car, the testing device provided by this invention is carried by the workman who is to make the test to the car, the equipment of which is to be tested.

The coupling 9 is then connected to the coupling associated with a source of fluid under pressure, such as the yard line in a railroad yard, while the coupling 10 is connected to the coupling on the flexible hose at one end of the brake pipe on the car. A dummy coupling is secured to the coupling on the flexible hose at the other end of the car to close the passage through this coupling, while the angle cocks at the ends of the car are turned to their open positions.

When the testing device is connected to the supply line and to the brake pipe on the car on which the brake equipment is to be tested, a valve in the supply line, not shown, is opened, thereby permitting fluid under pressure to flow through the coupling 9 to the chamber 14 outwardly of the air straining element 12. Fluid under pressure supplied to the chamber 14 will flow radially through the fibrous material in the air straining element 12 to the chamber 15, and thence to the supply passage 16 in the head 6 leading to the chamber 18 in the brake valve device 2 and to the feed valve device 3.

At this time the handle 22 and the rotary valve 20 of the brake valve device 2 are held in their lap position and fluid under pressure supplied to the chamber 18 of the brake valve device cannot flow therefrom to any of the ports in the seat of the rotary valve, while fluid under pressure supplied by way of the supply passage 16 to the feed valve device 3 will flow through the port in the choke plug 50 to the chamber 38, and thence to the passage 39 leading to a port in the seat of the rotary valve 20 of the brake valve device 2. However, as the rotary valve 20 is in the lap position at this time, as stated above, fluid under pressure supplied to the passage 39 cannot flow therefrom, and there will be a rapid increase in the pressure of the fluid in the chamber 38.

As a result of the increase in the pressure of the fluid in the chamber 38, force is exerted upon the diaphragm 35 to move it against the springs 41 and 42, and when the pressure of the fluid in the chamber 38 has increased to the predetermined relatively high value determined by the adjustment of the adjusting screw 47, the diaphragm 35 will be moved far enough against the springs 41 and 42 to move the sealing gasket 53 into engagement with the seat rib on the choke plug 50 surrounding the passage through the choke plug to thereby cut off the further supply of fluid under pressure to the chamber 38.

In order to charge the brake equipment being tested, the handle 22 of the brake valve device 2 is turned from the lap position to one of its charging positions, such as the first charging position, and on this movement of the handle 22, the rotary valve 20 is turned to a position in which a port 90 therein establishes communication between the valve chamber 18 and the passage 80, leading to the valve chamber 78 of the equalizing valve device 4, while another port 91 in the rotary valve 20 of the brake valve device 2 establishes communication between the passage 39 leading from the chamber 38 of the feed valve device 3, and the passage 59 leading to the chamber in the control reservoir 1 with the result that fluid under pressure may flow at a rapid rate from the chamber 38 of the feed valve device 3 to the control reservoir 1.

On the flow of fluid under pressure from the chamber 38 there is a reduction in the pressure of fluid present therein, and a corresponding reduction in the force exerted thereby upon the diaphragm 35, and the diaphragm 35 is thereupon moved by the springs 41 and 42 so that a sealing gasket 56 is moved away from the seat rib on the choke 50 to permit fluid under pressure to flow through the port in the choke plug 50 to maintain the pressure of the fluid in the chamber 38, from which the fluid flows by way of the passage 39 and the port 91 in the rotary valve 20 to the passage 59 leading to the chamber in the control reservoir 1, while fluid under pressure flows by way of a branch of the passage 59 to the chamber 58 at one face of the diaphragm 57 of the equalizing valve device 4, and also to the pressure responsive mechanism of the duplex gauge 5 to operate the pointer 86 which indicates the pressure of the fluid present in the control reservoir 1.

On an increase in the pressure of the fluid in the chamber 58 of the equalizing valve device 4, force is exerted by this fluid under pressure upon the diaphragm 57 to move the diaphragm and the stem 61 downwardly, as viewed in the drawings, to thereby press the sealing gasket 63 of the valve 62 against the seat rib 64 to cut off communication between the chamber 60 and the atmospheric passage 65. On engagement of the sealing gasket 63 with the seat rib 64, and upon further downward movement of the stem 61, the spring 67 is compressed so as to maintain the valve 62 in the seated position, while limiting the degree of force exerted on the gasket 63 to thereby prevent damage to the sealing gasket 63.

On downward movement of the stem 61, the lever 73 is moved in a counterclockwise direction about the pin 75, and the various parts of the equalizing valve device 4 are arranged and proportioned so that on slight further downward movement of the stem 61 beyond the point at which the valve 62 seals upon the seat rib 64, the lever 73 will engage the end of the fluted stem of the valve 77 and move the valve away from the seat rib 82 against the spring 81 to thereby permit fluid under pressure supplied from the supply passage 16 to the rotary valve chamber 18 in the brake valve device 2, and through the port 90 in the rotary valve 20 and the passage 80 to valve chamber 78, to flow to the chamber 60 in the equalizing valve device 4, from which it flows to the brake pipe passage 32 formed in the head 6, and thence through the coupling 10 to the brake pipe of the brake equipment which is being tested.

The valve 77 is of relatively large size, while the port 90 and the passage leading to the valve chamber 78 are of relatively large flow capacity with the result that when the valve 77 is moved away from the seat rib 82, fluid under pressure may flow at a rapid rate to the chamber 60 and thence to the brake pipe passage 32 and to the brake equipment on the car. Accordingly the equalizing valve device 4 will operate to increase the pressure of the fluid in the brake pipe passage 32 substantially as rapidly as the pressure of the fluid in the control reservoir is increased.

If the pressure of the fluid in the chamber 60 and in the brake pipe passage 32 increases more rapidly than the pressure of the fluid in the control reservoir and in the chamber 58 is increased, the fluid under pressure present in the chamber 60 will exert greater force upon the diaphragm 57 than is exerted by the fluid under pressure in the chamber 58 at the opposite face of the diaphragm, and the diaphragm 57 and the stem 61 will be moved upwardly, as viewed in the drawings, thereby causing the lever 73 to be moved in a clockwise direction about the pin 75 to permit the valve 77 to be moved towards its seat to reduce the rate of flow of fluid under pressure to the chamber 60 and to the brake pipe passage 32.

It will be seen, therefore, that the equalizing valve device 4 has sufficient capacity to supply fluid under pressure to the brake pipe passage 32 to increase the pressure of the fluid therein substantially as rapidly as the pressure of the fluid in the control reservoir 1 is increased by fluid supplied by the feed valve device 3, and that the equalizing valve device 4 will operate to reduce the rate of supply of fluid under pressure to the brake pipe passage 32 if the pressure in the brake pipe passage 32 tends to increase more rapidly than the pressure of the fluid in the control reservoir 1 is increased.

When the pressure of the fluid in the control reservoir 1 has been increased to the pressure which the feed valve device 3 is adjusted to supply, the pressure of the fluid in the valve chamber 38 will exert sufficient force upon the diaphragm 35 to move it against the springs 41 and 42 so that the sealing gasket 56 carried by the stem 52 engages the seat rib on the choke plug 50 to cut off the further supply of fluid under pressure to the valve chamber 38 and to the control reservoir 1.

After the supply of fluid under pressure to the control reservoir 1 is cut off, the equalizing valve device 4 will continue to supply fluid under pressure from the supply passage 16 to the brake pipe passage 32 until the pressure of the fluid in the brake pipe passage 32 and in the valve chamber 60 is increased substantially to or slightly above the pressure of the fluid in the control reservoir 1 and in the chamber 58 at the face of the diaphragm 57. On an increase in the pressure of the fluid in the chamber 60 substantially to this value, the force exerted thereby upon the diaphragm 57 will move the diaphragm 57 upwardly, as viewed in the drawings, thereby causing the lever 73 to move about the pin 75 away from the end of the stem of the valve 77, which is thereupon moved to the seated position by the spring 78 to cut off the supply of fluid under pressure from the supply pipe 16 to the chamber 60 and to the brake pipe passage 32.

At this time the pointer 87 of the duplex gauge 5 indicates the pressure of the fluid present in the brake pipe passage 32, but because of the restricted flow capacity of certain of the ports in the triple valve of the brake equipment being tested, certain portions of the brake equipment may not be fully charged even though the pointer 87 indicates that the pressure of the fluid present in the brake pipe passage 32 equals that present in the control reservoir 1.

At this time in order to ascertain whether or not the brake equipment is fully charged, the handle 22 of the brake valve device 2 is turned from the charging position to the lap position, in which communication is cut off between the valve chamber 18 and the passage 80 leading to the equalizing valve device 4, thereby cutting off the supply of fluid under pressure from the supply passage 16 to the brake pipe passage 32.

If at this time the brake equipment being tested is not fully charged, fluid under pressure will flow from the brake pipe passage 32 to the brake equipment, thereby reducing the pressure of the fluid present in the brake pipe passage 32, and this reduction in pressure will be indicated by the pointer 87 of the duplex gauge 5. If it is found that the brake equipment is not fully charged, the handle 22 of the brake valve device 2 is returned to the charging position in which communication is established between the valve chamber 18 and the passage 80 leading to the equalizing valve device 4, and the equalizing valve device 4 will operate to supply fluid under pressure from the supply passage 16 to the brake pipe passage 32 until the brake pipe passage 32 and the connected passages are charged to the pressure present in the control reservoir 1 and the equalizing valve device 4 will thereafter cut off the further supply of fluid under pressure to the brake pipe passage 32.

Application test

After the brake equipment has been fully charged, the testing device provided by this invention may be employed to ascertain whether or not the brake equipment being tested will operate properly on a reduction in brake pipe pressure at a service rate to produce a service application of the brakes.

In order to make this test of the brake equipment, the handle 22 of the brake valve device is turned to one of its service application positions, such as the position designated in Fig. 3 of the drawings as the first service position. As a result of this movement of the handle 22, the rotary valve 20 is turned to a position in which a port 93 therein establishes communication between the valve chamber 18 and the passage 80 leading to the equalizing valve device 4, and in which the rotary valve cuts off communication between the passage 39 leading from the feed valve device 3, and the passage 59 leading to the control reservoir 1, while a port 94 in the rotary valve 20 establishes communication between an atmospheric exhaust port 95 and a passage 97 which leads from the control reservoir passage 59 to a port in the seat of the rotary valve 20. The passage 97 has a choke 98 interposed therein to restrict the rate of flow of fluid therethrough.

On movement of the handle 22 to the first service position, therefore, fluid under pressure will be released at a restricted rate from the control reservoir 1 by way of the passages 59 and 97, the choke 98, the port 94 in the rotary valve 20 and the atmospheric passage 95.

The choke 98 is proportioned to limit the rate of flow of fluid under pressure from the control reservoir 1 to a rate which enables the presure of the fluid in the control reservoir to reduce substantially as rapidly, but not more rapidly, than the maximum rate at which the pressure of the fluid in the brake pipe on a car is reduced in effecting a service application of the brakes on a train of which the car forms a part.

The port 94 in the rotary valve 20 has a choke 99 interposed therein, as indicated in Fig. 3 of the drawings, which is a diagram of the ports in the rotary valve 20. The choke 99 is of somewhat smaller flow capacity than the choke 98 with the result that in this position of the rotary valve 20, the rate of release of fluid under pressure from the control reservoir 1 is such that the pressure of the fluid in the control reservoir will reduce somewhat less rapidly than the maximum service rate and at a rate which is approximately equal to the normal service rate of reduction in brake pipe pressure.

On the release of fluid under pressure from the control reservoir 1 there is a reduction in the pressure of the fluid in this reservoir, and a similar reduction in the pressure of the fluid in the chamber 58 of the equalizing valve device 4. On this reduction in the pressure of the fluid in the chamber 58, the higher pressure of the fluid in the chamber 60 moves the diaphragm 57 upwardly, as viewed in Fig. 1 of the drawings, thereby causing the stem 61 to be moved upwardly, while on this movement of the stem 61, the lever 73 is moved in a clockwise direction about the pin 75 with the result that the end of the lever 73 is moved away from the end of the stem of the valve 77 so that this valve is held in the seated position by the spring 81.

On initial upward movement of the stem 61, the spring 67 expands, thereby holding the valve 62 in engagement with the seat rib 64, but after a predetermined movement of the stem 61, the retaining ring 68 engages the valve 62 so that upon further upward movement of the stem 61, the valve 62 is lifted away from the seat rib 64 to open communication between the chamber 60 and the atmospheric exhaust passage 65 to thereby release fluid under pressure from the chamber 60, and also from the brake pipe passage 32 which is open to the valve chamber 58, while on the release of fluid under pressure from the brake pipe passage 32, fluid under pressure flows thereto from the brake pipe of the equipment which is being tested.

The flow capacity of the ports and passages in the equalizing valve device 4 is large enough to permit fluid under pressure to be released from the brake pipe passage 32, and from the car brake pipe connected thereto, rapidly enough to enable the pressure of the fluid in the brake pipe passage and in the brake pipe connected thereto to reduce at an extremely rapid rate.

Accordingly, the equalizing valve device 4 will operate to release fluid under pressure from the brake pipe passage 32 rapidly enough to reduce the pressure of the fluid therein at the same rate that the pressure of the fluid in the control reservoir 1 is reduced by operation of the brake valve device 2.

If the pressure of the fluid in the brake pipe passage 32 reduces more rapidly than the pressure of the fluid in the control reservoir 1 is reduced by operation of the brake valve device 2, the pressure of the fluid in the chamber 60 at one face of the diaphragm 57 will be less than the opposing pressure of the fluid in the chamber 58 at the opposite face of the diaphragm 57, and the diaphragm 57 and the stem 61 will be moved downwardly by the higher pressure present in the chamber 58, thereby moving the valve 62 towards the seat rib 64 to reduce the rate of flow of fluid under pressure from the valve chamber 60 and from the brake pipe passage 32 to maintain the rate of reduction in the pressure of the fluid in the brake pipe passage 32 substantially equal to that which takes place in the control reservoir 1.

Similarly, if the pressure of the fluid in the brake pipe passage 32 does not reduce as rapidly as the pressure of the fluid in the control reservoir 1 is reduced by operation of the brake valve device 2, the pressure of the fluid present in the chamber 60 at one face of the diaphragm 57 will exceed the opposing pressure of the fluid in the chamber 58, and the higher pressure of the fluid present in the chamber 60 will move the diaphragm 57 and the stem 61 upwardly, thereby causing the valve 62 to be moved farther away from the seat rib 64 to increase the rate of release of fluid under pressure from the brake pipe passage 32, and thus maintain the pressure of the fluid in the brake pipe passage 32 substantially equal to that present in the control reservoir 1.

It will be seen also that in the First Service position of the rotary valve 20, a port 93 in the rotary valve establishes communication between the valve chamber 18, which is supplied with fluid under pressure from the supply passage 16, and the port 80 leading to the valve chamber 78 of the equalizing valve device 4.

If, therefore, the pressure of the fluid in the brake pipe passage 32 should for any reason decrease too rapidly, the diaphragm 57 and the stem 61 of the equalizing valve device 4 will be moved downwardly, thereby moving the lever 73 in a counterclockwise direction about the pin 75 so that the end of the lever 73 will press against the end of the stem of the valve 77 and move it away from its seat to permit the supply of fluid under pressure from the valve chamber 78 to the chamber 60 and to the brake pipe passage 32 to restore the pressure of the fluid in the brake pipe passage 32 to that present in the control reservoir 1. Thereafter, if the pressure of the fluid in control reservoir 1 continues to decrease, the equalizing valve device 4 will be operated, as described in detail above, to cut off the supply of fluid under pressure to the brake pipe passage 32, and to release fluid under pressure therefrom to reduce the pressure of the fluid present in the brake pipe passage 32 substantially as rapidly as the pressure of the fluid in the control reservoir 1 is reduced by operation of the brake valve device 2.

When the pressure of the fluid in the control reservoir 1 has been reduced by a predetermined amount, such as ten pounds, the handle 22 of the brake valve device is returned to the lap position, in which the release of fluid under pressure from the control reservoir 1 is cut off, and in which the communication between the valve chamber 18 and the passage 80 leading to the equalizing valve device 4 is cut off.

As a result of this movement of the rotary valve 20 of the brake valve device 2, the release of fluid under pressure from the control reservoir 1 is cut off and the equalizing valve device 4 will operate to release fluid under pressure from the brake pipe passage 32 until the pressure of the fluid present therein, and in the chamber 60, has been reduced substantially to or slightly below the pressure present in the control reservoir 1, whereupon the diaphragm 57 and the stem 61 will be moved downwardly, as viewed in Fig. 1 of the drawings, thereby moving the valve 62 into engagement with the seat rib 64 to cut off the release of fluid under pressure from the brake pipe passage 32 through the exhaust passage 65.

If the brake equipment being tested is in proper working condition, it will operate in response to the reduction in brake pipe pressure produced by the testing device to effect a service application of the brakes before the brake pipe pressure has been reduced to the extent of ten pounds. If the brake equipment fails to apply before a reduction of ten pounds in brake pipe pressure is effected, the triple valve of the brake equipment is defective and should be removed and repaired before the car on which it is mounted is placed in service.

*Brake pipe leakage test*

The testing device provided by this invention provides means by which the condition of brake pipe on a car and the presence of leaks therein can be determined. In order to make this test, the handle of the brake valve device 2 is turned to one of its service application positions, such as the second service application position in which, a port 100 therein establishes a communication between the passage 97 and the atmospheric port 95 through which fluid under pressure is released from the control reservoir 1 at the rate determined by the choke 98 in the passage 97. When the pressure of the fluid in the control reservoir has been reduced five additional pounds below that present after the completion of the application test, that is, to a pressure of approximately fifty-five pounds, the handle 22 of the brake valve device 2 is turned to the lap position in which the release of fluid under pressure from the control reservoir 1 is cut off, and in which the rotary valve 20 cuts off communication between the chamber 18 and the passage 80 leading to the equalizing valve device 4.

Upon the release of fluid under pressure from the control reservoir 1, the equalizing valve device 4 operates, as described in detail above, to release fluid under pressure from the brake pipe passage 32 and from the brake pipe connected thereto to reduce the pressure of the fluid present therein to the pressure at which the control reservoir is reduced.

After the handle 22 of the brake valve device 2 is returned to the lap position, the operator can determine whether or not there is excessive leakage of fluid under pressure from the brake pipe of the brake equipment being tested by observing the pointer 87 of the duplex gauge 5, which indicates the pressure of the fluid present in the brake pipe passage 32, and therefore in the brake pipe of the equipment being tested.

If there is any leakage of fluid under pressure from the brake pipe, there will be a reduction in the pressure of the fluid in the brake pipe and in the brake pipe passage 32, and this reduction will be indicated by the pointer 87 of the duplex gauge 5. If the rate of reduction in brake pipe pressure as a result of leakage therefrom exceeds a predetermined amount, such as two pounds in one minute, it indicates that leakage of fluid from the brake pipe is excessive, and that the brake equipment on the car should be repaired before the car is restored to service.

At this time leakage of fluid under pressure from the brake pipe will result in reducing brake pipe pressure below that present in the control reservoir, and the higher pressure present in the control reservoir will cause movement of the diaphragm 57 and the stem 61 of the equalizing valve device 4 to move the lever 73 to unseat the valve 77. However, this is without consequence, since, as pointed out above, in the lap position of the rotary valve 20, the supply of fluid to the passage 80 leading to the equalizing valve device 4 is cut off.

*Auxiliary reservoir and graduating valve leakage test*

If the triple valve of the brake equipment being tested operated during the brake pipe leakage test to release the brakes, it is an indication that the triple valve has a leaky graduating valve, that there is a leak from the auxiliary reservoir volume, or that there is a leak in the testing device permitting fluid under pressure to flow from the supply passage 16 to the brake pipe of the equipment being tested.

*Release test*

The testing device provided by this invention provides means by which the operation of a brake equipment being tested to effect the release of the brakes on an increase in brake pipe pressure following an application may be accurately determined, and this testing device is arranged so that the reliability of this test is not affected by the volume of the brake pipe of the equipment which is being tested.

This test is extremely important as the failure of a brake to release upon an increase in the pressure of the fluid in the brake pipe following an application is one of the most serious defects which can occur in a brake equipment. This defect may arise as a result of the development of a relatively high degree of leakage of fluid under pressure around the piston of the triple valve of the brake equipment, thereby reducing the pressure differential which is developed between the brake pipe and the auxiliary reservoir on an increase in brake pipe pressure, and correspondingly reducing the force exerted on the piston of the triple valve and tending to move it to the release position.

If a car having thereon a triple valve in which there is a relatively high degree of leakage of fluid around the piston is located at the rear of a train, where the increase in brake pipe pressure in releasing the brakes takes place relatively slowly, fluid under pressure may leak from the brake pipe around the piston of the triple valve to the auxiliary reservoir to increase the pressure of the fluid in the auxiliary reservoir substantially as rapidly as the pressure of the fluid in the brake pipe is increased.

If this condition occurs, the piston of the triple valve will remain in the application position, and will not move to the release position, and accordingly the brakes on the car will remain applied regardless of the degree of increase in brake pipe pressure which is effected.

The method followed in using this testing device in order to test the operation of the brake equipment in effecting a release of the brakes following an application will now be described.

Assuming that the brakes remain applied from the preceding test, and that the brake pipe on the vehicle is charged with fluid under pressure to approximately forty-five pounds, the handle 22 of the brake valve device 2 is turned to the First Service position, in which the port 94 in the rotary valve 20 establishes communication between the passage 97 and the atmospheric passage 95 so that fluid under pressure is released from the control reservoir 1 at a restricted rate determined by the choke 99 in the port 94 in the rotary valve 20. When the pressure of the fluid in the control reservoir 1 has reduced to a value slightly below brake pipe pressure, which may be determined by observation of the duplex gauge 5, the handle 22 of the brake valve device 2 is turned to the lap position, thereby cutting off the further release of fluid under pressure from the control reservoir 1.

On this reduction in the pressure of the fluid in the control reservoir 1, if control reservoir pressure is reduced below brake pipe pressure, the equalizing valve device 4 will operate, as described in detail above, to release fluid under pressure from the brake pipe passage 32 with the result that when the handle 22 of the brake valve device 2 is returned to the lap position, the pressure of the fluid in the brake pipe passage 32 will be reduced to the pressure present in the control reservoir 1, and the release of fluid under pressure from the brake pipe passage 32 will be thereafter cut off.

The handle 22 of the brake valve device 2 is now turned to its second charging position in which the port 90 in the rotary valve 20 establishes communication between the valve chamber 18 and the passage 80 leading to the equalizing valve device 4, and in which a port 102 in the rotary valve 20 establishes communication between the control reservoir passage 59 and a passage 104 leading from the passage 39, which leads from the feed valve device 3. The passage 104 has a choke 106 interposed therein for restricting the rate of flow of fluid therethrough, while the port 102 in the rotary valve 20 has interposed therein a chock indicated at 107 in Fig. 3 of the drawings. The choke 107 is of somewhat smaller flow capacity than the choke 106 with the result that fluid under pressure is supplied from the feed valve device 3 to the control reservoir 1 at a restricted rate determined by the choke 107, and causes a predetermined relatively slow increase in the pressure of the fluid in the control reservoir.

On the increase in the pressure of the fluid in the control reservoir, the equalizing valve device 4 operates, as described in detail above, to supply fluid under pressure from the supply passage 16 to the brake pipe passage 32, and thus to the brake pipe of the equipment being tested, to increase the pressure of the fluid in brake pipe passage 32 and in the brake pipe which is connected thereto substantially as rapidly as the pressure of the fluid in the control reservoir is increased.

As the pressure of the fluid in the control reservoir is increased at a relatively slow rate, because of the restricted flow capacity of the choke 107 in the port 102 in the rotary valve 20, the increase in the pressure of the fluid in the brake pipe passage 32 and in the brake pipe which is connected thereto will take place at a similar relatively slow rate.

The brake pipe on the car is in free open communication with the brake pipe passage 32 in the head 6 so that the pressure of the fluid in the brake pipe on the car will increase at the same rate as the pressure of the fluid in the brake pipe passage 32 is increased.

The ports and passages in the equalizing valve device 4 have sufficient flow capacity to enable the equalizing valve device to supply fluid under pressure to the brake pipe passage 32, and thus to the brake pipe of the brake equipment being tested, to build up the pressure of the fluid therein at substantially the same rate as the pressure of the fluid in the control reservoir is increased, irrespective of the volume of the brake pipe.

As explained in detail above, if the pressure of the fluid in the brake pipe passage 32 is not increasing as rapidly as the pressure of the fluid in the control reservoir 1 is increased by the supply of fluid under pressure thereto by operation of the brake valve device 2, the diaphragm of the equalizing valve device 4 will move the valve 77 farther away from its seat to increase the rate of supply of fluid under pressure to the brake pipe passage 32 to maintain the increase in the pressure of the fluid in the brake pipe passage 32 approximately equal to the rate of increase in the pressure of the fluid in the control reservoir 1. Similarly, if the pressure of the fluid in the brake pipe passage 32 should increase somewhat more rapidly than the pressure of the fluid in the control reservoir 1 is increased, the diaphragm of the equalizing valve device 4 will be moved upwardly, thereby moving the lever 73 in a direction to permit the valve 77 to move towards its seat to reduce the rate of supply of fluid under pressure to the brake pipe passage 32, and accordingly maintain the rate of increase in the pressure of the fluid in the passage 32 approximately equal to the increase in the pressure of the fluid in the control reservoir 1.

It will be seen, therefore, that the rate of increase in the pressure of the fluid in the control reservoir 1 governs and regulates the rate of increase in the pressure of the fluid in the brake pipe passage 32 and in the brake pipe on the brake equipment being tested, and that the increase in the pressure of the fluid in the brake pipe of the brake equipment being tested will take place at the rate determined by the increase in control reservoir pressure irrespective of the volume of the brake pipe of the equipment being tested.

As a result of the increase in brake pipe pressure effected by operation of the testing device, the piston of the triple valve of the brake equipment being tested should move from the application position to the release position within a specified time interval, such as one minute, and if it fails to do so the triple valve is defective and should be removed for inspection and repair.

It will be seen that when brake equipments are subjected to the release test by means of the testing device provided by this invention, regardless of the volume of the brake pipes of the brake equipments being tested, the rate of increase in brake pipe pressure is in accordance with the rate of increase in the pressure of the fluid in the control reservoir.

The rate of increase in the pressure of the fluid in the control reservoir is determined by the volume of the control reservoir and the flow capacity of the port in the rotary valve, and will always be the same regardless of variations in the volume of the brake pipes of the brake equipments which are tested.

Furthermore, the fluid under pressure which is supplied to the control reservoir is supplied from the feed valve device 3, which operates to supply fluid under pressure at a constant uniform pressure irrespective of the pressure present in the supply line to which the testing device is connected, and which under service conditions may vary within relatively wide limits.

It is to be observed also that the feed valve device 3 is employed only to supply fluid under pressure to charge the control reservoir 1, which is of relatively small volume, and is not required to furnish fluid under pressure to charge the brake equipment being tested. Accordingly, the feed valve device may be made small in size and light in weight, and extremely sensitive so that it will always supply fluid under pressure at the same constant uniform pressure with the result that the flow of fluid through the port in the rotary valve 20 to the control reservoir 1 will always take place at the same uniform rate.

It will be seen therefore that the testing device provided by this invention may be employed to give a release test to brake equipments on different types of cars, which differ greatly in length and which have thereon brake pipes which correspondingly vary greatly in volume. In any case the testing device provided by this invention will subject the brake equipment to the same uniform release test, and will condemn the valves which will not meet the requirements of the test, but will not condemn those which do meet these requirements.

Emergency test

The testing device provided by this invention may also be employed to subject the brake equipment being tested to an emergency test to determine if the equipment will operate on a reduction in brake pipe pressure at an emergency rate to effect an emergency application of the brakes.

In order to subject the brake equipment being tested to the emergency test, the handle 22 of the brake valve device 2 is first turned to the first charging position in which the port 91 in the rotary valve 20 establishes communication between the passage 39 leading from the feed valve device 3, and the passage 59 leading to the control reservoir 1, while the port 90 in the rotary valve 20 establishes communication between the valve chamber 18 and the passage 80 leading to the equalizing valve device 4.

On movement of the handle 22 to the first charging position, fluid under pressure is supplied from the feed valve device 3 to the control reservoir 1 at a rapid rate, and on the resulting increase in the pressure of the fluid in the control reservoir 1 the equalizing valve device 4 operates, as described in detail above, to supply fluid under pressure to the brake pipe passage 32, and thus to the brake pipe of the equipment being tested.

When the control reservoir 1 has been charged to the full pressure supplied by the equalizing valve device 3, which is assumed to be seventy pounds, and which may be determined by observation of the duplex gauge 5, the handle 22 of the brake valve device 2 is turned to the lap position, thereby cutting off the further supply of fluid under pressure to the control reservoir 1.

On this movement of the handle 22, the rotary valve 20 is turned to a position to cut off communication between the valve chamber 18 and the passage 80 leading to the equalizing valve device 4, but because of the operating characteristics of the equalizing valve device 4, the pressure of the fluid in the brake pipe passage 32, and in the connected brake pipe, will have been increased substantially as rapidly as the pressure of the fluid in the control reservoir 1 is increased, with the result that the pressure of the fluid in the brake pipe passage 32 will have been increased substantially the same value as that present in the control reservoir 1 before the supply of fluid under pressure to the equalizing valve device is cut off by operation of the brake valve device 2.

After the handle 22 of the brake valve device 2 has been in the lap position for a brief time interval, it is turned to the emergency position, thereby turning the rotary valve 20 to a position in which a port 110 therein establishes communication between the control reservoir passage 59 and the exhaust port 95 to release fluid under pressure from the control reservoir 1 at a rapid rate. In addition, on this movement of the handle 22, the cam element 26 is turned to a position in which the cam surface thereon engages and presses against the end of the stem of the valve 27 and moves the valve 27 against the spring 29 away from the seat rib 30 to release fluid under pressure at a rapid rate from the chamber 28 through the passage in which the fluted stem of the valve 27 is mounted. On the release of fluid under pressure from the chamber 28, fluid flows thereto from the brake pipe passage 32 and from the brake pipe of the equipment which is being tested, thereby producing a rapid reduction in the pressure of the fluid in the brake pipe and in the brake pipe passage 32.

On the release of fluid under pressure from the control reservoir 1 by operation of the brake valve device 2, there is a reduction in the pressure of the fluid in the chamber 58 of the equalizing valve device 4, and this valve device operates, as described in detail above, to release fluid under pressure from the brake pipe passage 32 if the pressure of the fluid in the brake pipe passage does not reduce by flow past the valve seat 30 as rapidly as the pressure of the fluid in control reservoir 1 is reduced.

In the emergency position of the rotary valve 20, the supply of fluid under pressure from the valve chamber 18 to the passage 80 leading to the equalizing valve device 4 is cut off. Accordingly, if the pressure of the fluid in the brake pipe passage 32 should reduce more rapidly than the pressure of the fluid in the control reservoir is reduced at this time, which condition would cause the diaphragm 57 and the stem 61 of the equalizing valve device 4 to unseat the valve 77, fluid under pressure will not be supplied to the brake pipe passage.

The handle 22 of the brake valve device 2 is held in the emergency position until the pressure of the fluid in the brake pipe passage has been reduced twenty pounds, as indicated by the pointer 87 of the duplex gauge 5, and the handle is thereupon turned to the lap position in which fluid under pressure is no longer released from the control reservoir 1, and in which the cam surface on the cam element 26 no longer presses against the end of the stem of the valve 27. Accordingly, the valve 27 will be moved to the seated position by the spring 29 to cut off the further release of fluid under pressure from the brake pipe passage 32.

As a result of this reduction in brake pipe pressure at a rapid rate, the brake equipment being tested should operate to produce an emergency application of the brakes, and if it fails to do so, it is an indication that the triple valve of the brake equipment is defective and should be repaired.

*Service stability test*

The testing device provided by this invention is also adapted to determine the service stability of the triple valve in the brake equipment being tested, that is, the ability of triple valve to operate in response to a reduction in brake pipe pressure at a service rate to produce a service application of the brakes without operating to produce an unintended emergency application of the brakes.

In order to perform this test, the handle 22 of the brake valve device 2 is turned to the first charging position in which fluid under pressure is supplied from the feed valve device 3 to the control reservoir 1, and in which the port 90 in the rotary valve 20 establishes communication between the valve chamber 18 and the passage 80 leading to the equalizing valve device 4. The handle 22 is left in the first charging position until the control reservoir 1 is charged to seventy pounds pressure, which is the full pressure of the fluid supplied by the feed valve device 3, while the equalizing valve device 4 operates, as described in detail above, to supply fluid under pressure from the supply passage 16 to the brake pipe passage 32 and to the brake equipment being tested to charge these to the pressure present in the control reservoir 1.

When the equipment has been charged to the full pressure of seventy pounds, the handle 22 of the brake valve device 2 is turned from the first charging position to the second service position in which the port 100 in the rotary valve 20 establishes communication between the passage 97 and the atmospheric port 95 to permit fluid under pressure to be released from the control reservoir 1 at the rate determined by the choke 98 interposed in the passage 97.

The choke 98 is proportioned to permit fluid under pressure to escape from the control reservoir 1 to reduce the fluid under pressure therein substantially at the maximum rate at which brake pipe pressure is reduced during a reduction in brake pipe pressure at a service rate.

On this reduction in the pressure of the fluid in the control reservoir 1, the equalizing valve device 4 operates, as described in detail above, to release fluid under pressure from the brake pipe passage 32 and the connected brake pipe to reduce the pressure of the fluid therein at substantially the same rate as the pressure of the fluid in the control reservoir 1 is reduced by flow through the choke 98.

The handle 22 is held in the second service position until the pressure of the fluid in control reservoir 1 has been reduced twenty pounds, that is from seventy pounds to fifty pounds, and is thereafter turned to the lap position in which the further release of fluid under pressure from the control reservoir 1 is cut off. The equalizing valve device 4 operates to reduce the pressure of the fluid in the brake pipe passage 32, and in the connected brake pipe, to the pressure present in the control reservoir 1 and thereafter operates to cut off the further release of fluid under pressure.

As a result of this reduction in brake pipe pressure, the triple valve of brake equipment being tested should operate to produce a service application of the brakes, and should not operate to produce an emergency application of the brakes. If as a result of this test the triple valve does operate to produce an emergency application of the brakes, it is an indication that the triple valve is in defective condition, and that it should be removed and repaired before the car is restored to service.

*Tests of "AB" type brake equipments*

The tests heretofore described are those employed in testing the condition of brake equipments employing triple valves of the K type which are now in wide use. However, this testing device is not limited to use in testing brake equipments employing K type triple valves, but is also adapted to determine the condition of brake equipments incorporating AB type of brake controlling valve devices, which have recently been adopted as standard equipment on railway freight cars and are being placed in service in increasing numbers. The AB type brake controlling valve device is described and claimed in my U. S. Patent No. 2,031,213, issued February 18, 1936.

In order to test a brake equipment of the AB type, the couplings of the testing device are connected to the coupling on the flexible hose at one end of the brake pipe and to a coupling associated with a supply line, as previously described.

The brake pipe leakage test, the auxiliary reservoir leakage test, and the service stability test of a brake equipment incorporating an AB type of brake controlling valve device are substantially the same as the corresponding tests of a brake equipment incorporating a K type triple valve and need not be described in detail.

The other tests of a brake equipment of the AB type are somewhat different than the corresponding test of a K type equipment.

*Service application test of an "AB" type equipment*

In order to make a service application test of a brake equipment of the AB type, the handle 22 of the brake controlling valve device 2 is turned to the first charging position to charge the equipment to the full pressure of seventy pounds as supplied by the feed valve device 3. When the equipment is charged to the pressure of seventy pounds, the handle 22 is turned to the lap position in which the further supply of fluid under pressure to the control reservoir 1 and to the equalizing valve device 4 is cut off, and the handle 22 is permitted to remain in this position for a brief time interval while the operator observes the pointer 87 of the duplex gauge 5 to ascertain whether or not any reduction in brake pipe pressure occurs. If such a reduction does take place, it is an indication that the brake equipment is not fully charged and the handle 22 should be returned to the charging position to supply fluid under pressure to the equalizing valve device 4 to permit it to supply fluid to the brake pipe passage 32 and to the brake equipment on the car being tested until the equipment is fully charged.

When the brake equipment is charged to the full pressure of seventy pounds, the handle 22 of the brake valve device 2 is turned to the first service position in which the port 94 in the rotary valve 20 establishes communication between the passage 97 leading from the control reservoir passage 59, and the atmospheric port 95 to permit fluid under pressure to escape from the control reservoir 1 at the rate determined by the choke 99 in the port 94, and this rate is such as to enable the pressure of the fluid in the control reservoir 1 to be reduced substantially at the rate brake pipe pressure is reduced in effecting a service application of the brakes.

The handle 22 of the brake valve device 2 is permitted to remain in the first service position until the brakes start to apply, and the handle 22 is then promptly turned to the lap position to cut off the further release of fluid under pressure from the control reservoir 1.

The operator should observe the duplex gauge 5 at the time the brakes start to apply to ascertain the amount of reduction in brake pipe pressure which was necessary to effect operation of the brake equipment to initiate a service application of the brakes. If the brake equipment is in proper condition, the brake application will be obtained with a brake pipe reduction of not more than three pounds.

As a result of operation of an AB type of brake controlling valve device in effecting a service application of the brakes, fluid under pressure is supplied from the brake pipe to the brake cylinder until a predetermined pressure is developed in the brake cylinder. As a result of this supply of fluid under pressure from the brake pipe there will be a reduction in brake pipe pressure, and this reduction, as indicated by the duplex gauge 5, should not be less than four pounds nor more than ten pounds. The operator is able to ascertain when the supply of fluid under pressure from the brake pipe to the brake cylinder is cut off by observing the reduced rate of reduction in brake pressure, as indicated by the duplex gauge 5, which occurs at this time.

*Release test of an "AB" type equipment*

The release test of a brake equipment of AB type is the same as the release test of a brake equipment of the K type, except that a brake equipment of the AB type should operate in response to an increase in brake pipe pressure to release the brakes much more rapidly than an equipment of the K type. A period of one minute is allowed from the time of the start of an increase in brake pipe pressure for an equipment of the K type to release, while under similar conditions an equipment of the AB type should release in twenty seconds.

*Emergency test of an "AB" type equipment*

The emergency test of a brake equipment of the AB type is similar to that of the corresponding test of an equipment of the K type. In each case this test is performed after the completion of the service stability test. At this time a full service application of the brakes is in effect, while the brake pipe of the equipment being tested is charged with fluid at approximately fifty pounds pressure.

In order to make an emergency application test of a K type equipment, the brake equipment was first fully recharged, thereby effecting the release of the brakes, and the brake pipe pressure was thereafter reduced at an emergency rate to effect operation of the brake equipment to produce an emergency application of the brakes.

The AB type of equipment is intended to function to produce an emergency application of the brakes on a reduction in brake pipe pressure at an emergency rate, although a partial or even a full service application of the brakes is in effect at the time the reduction in brake pipe pressure at an emergency rate is initiated.

The emergency test of an equipment of the AB type is made without recharging the equipment following the completion of the service stability test, at which time, as pointed out above, a full service application of the brakes is in effect and the brake pipe is charged with fluid at fifty pounds pressure. Instead the handle 22 of the brake valve device 2 is turned to the emergency position in which the cam element 26 presses against the end of the stem of the valve 27 and holds the valve away from the seat rib 30 to permit the escape of fluid under pressure from the brake pipe at an emergency rate, while in this position of the handle 22, the port 110 of the rotary valve 20 establishes communication between the control reservoir passage 59 and the atmospheric port 95 to release fluid under pressure at a rapid rate from the control reservoir 1.

As a result of the reduction in brake pipe pressure at an emergency rate, the brake equipment should operate to effect an emergency application of the brakes. In effecting an emergency application of the brakes a brake controlling valve device of the AB type vents fluid under pressure from the brake pipe to reduce the pressure therein to atmosphere, and hence the operation of the brake equipment to produce an emergency application of the brakes can be ascertained by observation of the duplex gauge 5, which should indicate that brake pipe pressure is reduced to atmosphere.

*Release test after an emergency application*

The AB type of brake equipment incorporates means operative on an increase in brake pipe pressure following an emergency application of the brakes to establish a communication through which fluid under pressure may flow from the brake cylinder and from the auxiliary reservoir to the brake pipe to assist in recharging the brake pipe, and to also reduce the auxiliary reservoir pressure and thus facilitate the movement of the piston of the service portion of the brake controlling valve device to its release position. The testing device provided by this invention is arranged to determine the condition of this portion of an AB brake equipment.

This test is made following the emergency application test of the AB brake equipment. On completion of the emergency application test the operator should wait a brief time interval, such as one minute, before attempting to release the brake equipment in order to permit the vent valve of the AB equipment to close. During this time interval the handle 22 of the brake valve device 2 should be held in the first service position in which the port 94 in the rotary valve 20 establishes communication between the passage 97 leading from the control reservoir passage 59, and the atmospheric passage 95 to thereby release any fluid under pressure present in the control reservoir 1.

After the expiration of the one minute time interval, the handle 22 of the brake valve device 2 is turned to the first charging position in which the port 90 therein establishes communication between the valve chamber 18 and the passage 80 leading to the equalizing valve device 4, and in which the port 91 in the rotary valve establishes a communication from the feed valve passage 39 to the control reservoir passage 59 through which fluid under pressure may flow to the control reservoir at a rapid rate.

The handle 22 is left in the first charging position until the brake equipment is charged to a pressure of slightly less than twenty pounds and is then turned to the third charging position. The means in the brake equipment for supplying fluid under pressure from the brake cylinder and the auxiliary reservoir to the brake pipe is not operative until brake pipe pressure is increased to twenty pounds or more, and by using the first charging position to initially charge the brake equipment, the time required to carry out the test is shortened as the rate of charging in the first charging position is substantially more rapid than in the third charging position.

On movement of the handle 22 of the brake valve device 2 to the third charging position a port 112 in the rotary valve 20 establishes communication between the passage 104 leading from the feed valve passage 39, and the passage 59 leading to the control reservoir 1.

The port 112 has sufficient flow capacity to permit fluid under pressure to flow from the passage 104 to the control reservoir passage 59 at the full rate at which the fluid under pressure may flow through the choke 106 interposed in the passage 104, while the choke 106 is proportioned to permit fluid under pressure to flow from the feed valve device 3 to the control reservoir 1 to increase the pressure of fluid in the control reservoir at a relatively rapid rate. This rate is substantially more rapid than the rate at which brake pipe pressure is normally increased during the release of the brakes on a train with the handle of the engineer's brake valve device in its running position, and is comparable to the rate of increase in brake pipe pressure which occurs in the brake pipe on the cars at the forward end of a train while the engineer's brake valve device on the locomotive is in its release position, in which position fluid under pressure is supplied directly from the main reservoir to the brake pipe, instead of at the pressure supplied by the feed valve device associated with the engineer's brake valve device.

As a result of the increase in the pressure of the fluid in the control reservoir 1, the equalizing valve device 4 will operate as described in detail above to supply fluid under pressure to the brake pipe passage 32 and to the connected brake pipe to increase the pressure of the fluid therein substantially as rapidly as the pressure in the control reservoir 1 is increased.

As a result of this increase in brake pipe pressure, the piston of the emergency portion of the AB brake controlling valve device of the equipment being tested should move to its inner release position when the brake pipe pointer 87 of the duplex gauge 5 registers not less than twenty pounds nor more than twenty-eight pounds.

The operator is able to ascertain when the piston of the emergency portion moves to its inner release position by observing the duplex gauge 5. When the piston of the emergency portion moves to its inner release position, fluid under pressure flows from the brake cylinder and the auxiliary reservoir of the brake equipment being tested to the brake pipe and produces a rapid rise in brake pipe pressure, and causes the pressure of the fluid in the brake pipe to increase more rapidly than the pressure of the fluid in the control reservoir 1, as indicated by the pointer 86, is increased.

When the pressure of the fluid in the brake cylinder and the auxiliary reservoir of the brake equipment being tested has nearly equalized with that in the brake pipe, the flow of fluid under pressure to the brake pipe will be cut off and the rapid increase in the brake pipe pressure will be terminated.

*Use of testing device in testing other types of brake equipment*

The method of using the testing device provided by this invention to ascertain the condition of brake equipments of the K and AB types, which are employed on railway freight cars, has been described in detail. This testing device, however, is not limited to use in testing these types of brake equipments.

It will be seen that this testing device provides means to effect increases or decreases in the pressure of the fluid in the brake pipe of a brake equipment at either of a plurality of predetermined rates, regardless of the volume of the brake pipe. These predetermined rates of change in brake pipe pressure are those employed in the operation of vehicle fluid pressure brake equipments of different types, such as the brake equipments employed on passenger cars and special brake equipments for freight cars. Accordingly this testing device may be employed to test brake equipments of these types. The tests performed on these equipments are similar to those heretofore described, and need not be described in detail.

From the foregoing it will be seen that the testing device provided by this invention provides means to quickly and accurately determine the condition of the brake equipment on a car without removing the equipment from the car.

It will be seen also that the testing device is arranged so that the pressure of the fluid in the brake pipe of a brake equipment being tested is increased or decreased at rates in accordance with variations in the pressure of the fluid in a control reservoir. This control reservoir is of fixed volume and the ports through which fluid under pressure is supplied to and released from this reservoir may be accurately graduated in size to produce predetermined rates of change in the pressure of fluid in the control reservoir, which rates of change correspond to the rates of change which occur in brake pipe pressure in service.

As the changes in brake pipe pressure in the brake equipment being tested vary in accordance with changes in the pressure of the fluid in the control reservoir, which is of a fixed unchanging volume and is supplied with fluid or has fluid released therefrom through ports of fixed known flow capacity, the changes produced in brake pipe pressure during a test of a brake equipment will not be affected by the volume of brake pipe in the equipment, and will always take place at predetermined rates regardless of the volume of the brake pipe, which, as pointed out above, varies greatly on different types of cars.

Accordingly the tests will reliably reflect the condition of the brake equipment being tested, and will accurately show whether or not the brake equipment is in condition for further service or should be removed and repaired.

In addition, it will be seen that the testing device provided by this invention is of compact and rugged construction, and that it is light in weight so that it may be easily carried by a workman from one car to another to be tested.

Furthermore it will be seen that the testing device is very simple to operate, and that the only manipulation required of it is turn the handle of the brake valve device to its different positions.

While one embodiment of the improved testing device provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a portable testing device of the type described, a control reservoir comprising a substantially cylindrical shell open at one end, a head member secured to said shell and closing said end, a supply line coupling carried by said head and adapted to be connected to a counterpart coupling on a supply line charged with fluid under pressure, a brake pipe coupling carried by said head and adapted to be connected to a counterpart coupling at the end of the brake pipe on a vehicle, a feed valve carried by said head and being connected with said supply line coupling by way of a passage formed in said head, said feed valve being adapted to supply fluid under pressure to another passage formed in said head and through which fluid may be supplied to said control reservoir, a manually operated valve carried by said head and controlling the supply of fluid from the feed valve to the reservoir through said passage, and an equalizing valve device carried by said head, said equalizing valve device being responsive to the opposing pressures of the fluid in the control reservoir and of the fluid in a passage in said head open to the brake pipe coupling and controlling the supply of fluid from the passage in said head connected to the supply line coupling to the passage in said head connected to the brake pipe coupling.

2. In a portable testing device of the type described, a control reservoir comprising a substantially cylindrical shell open at one end, a head member secured to said shell and closing said end, a supply line coupling carried by said head and adapted to be connected to a counterpart coupling on a supply line charged with fluid under pressure, a brake pipe coupling carried by said head and adapted to be connected to a counterpart coupling at the end of the brake pipe on a vehicle, a feed valve carried by said head and being connected with said supply line coupling by way of a passage formed in said head, said feed valve being adapted to supply fluid under pressure to another passage formed in said head and through which fluid may be supplied to said reservoir, a manually operated valve carried by said head and controlling the supply of fluid from the feed valve to the reservoir through said passage, said manually operated valve also controlling a passage formed in said head and through which fluid under pressure may be released from said reservoir, and an equalizing valve device carried by said head, said equalizing valve device being responsive to the opposing pressures of fluid in the reservoir and of the fluid in a passage in said head open to the brake pipe coupling and controlling the supply of fluid from the passage in said head connected to the supply line coupling to the passage in said head connected to the brake pipe coupling.

3. In a portable device for determining the condition of the fluid pressure brake equipment on a vehicle, in combination, a member having a supply passage therein adapted to be connected to a source of fluid under pressure and also having formed therein a brake pipe passage adapted to be connected to the brake pipe on a vehicle, a control reservoir comprising a shell open at one end, said member being secured to said shell and closing the open end thereof, a communication through which fluid under pressure may be supplied only at a restricted rate from said supply passage to said reservoir, manually operated valve means carried by said member for controlling said communication and for also controlling a communication through which fluid may be released from said control reservoir, a valve device also carried by said member and responsive to the opposing pressures of the fluid in said reservoir and of the fluid in said brake pipe passage for supplying fluid under pressure from said supply passage to said brake pipe passage and for releasing fluid from said brake pipe passage, and gauges carried by said member for indicating the pressure of the fluid in the control reservoir and of the fluid in the brake pipe passage.

4. In a portable device for determining the condition of the brake equipment on a vehicle, in combination, a member having a supply passage therein adapted to be connected to a source of fluid under pressure and also having formed therein a brake pipe passage adapted to be connected to the brake pipe of a brake equipment to be tested, a control reservoir comprising a shell open at one end, said member being secured to said shell and closing the open end thereof, means for supplying fluid under pressure from said supply passage to said control reservoir through a passage formed in said member, valve means carried by said member for controlling the supply of fluid by said means to said control reservoir and for also controlling the release of fluid under pressure from said control reservoir, said valve means being operative to permit the supply of fluid under pressure by said means to said control reservoir at any one of a plurality of different predetermined rates and being also operative to permit the release of fluid under pressure from said control reservoir at either of a plurality of different predetermined rates, and a valve device carried by said member and responsive to the opposing pressures of the fluid in the control reservoir and of the fluid in the brake pipe passage for supplying fluid under pressure from said supply passage to said brake pipe passage, and for also releasing fluid under pressure from said brake pipe passage to vary the pressure of the fluid therein in accordance with variations in the pressure of the fluid in the control reservoir.

5. In a portable device for determining the condition of the brake equipment on a vehicle, in combination, a member having a supply passage formed therein adapted to be connected to a source of fluid under pressure and having also formed therein a brake pipe passage adapted to be connected to the brake pipe of a brake equipment to be tested, a control reservoir comprising a shell open at one end, said member being secured to said shell and closing the open end thereof, a feed valve carried by said member for supplying fluid from said supply passage at a uniform predetermined pressure to a communication through which fluid under pressure may be supplied to said control reservoir, valve means carried by said member and controlling the supply of fluid by said feed valve to said control reservoir and for also controlling the release of fluid under pressure from said control reservoir, said valve means being operative to permit the supply of fluid under pressure by said feed valve to said control reservoir at any one of a plurality of different predetermined rates, and being also operative to permit the release of fluid under pressure from said control reservoir at either of a plurality of different predetermined rates, and a valve device carried by said member and responsive to the opposing pressures of the fluid in the control reservoir and of the fluid in the brake pipe passage for supplying fluid under pressure from said supply passage to said brake pipe passage, and for also releasing fluid under pressure from said brake pipe passage to vary the pressure of the fluid therein in accordance with variations in the pressure of the fluid in the control reservoir.

6. In a portable device for testing the condition of the fluid pressure brake equipment on a vehicle, in combination, means having formed therein a brake pipe passage and a supply passage, the brake pipe passage being adapted to be connected to the brake pipe on a vehicle the brake equipment of which is to be tested, the supply passage being adapted to be connected to a source of fluid under pressure, a control reservoir associated with said means, a valve device responsive to the opposing pressures of the fluid in said control reservoir and of the fluid in said brake pipe passage, said valve device being operative on an increase in the pressure of the fluid in the control reservoir to supply fluid from the supply passage to the brake pipe passage to increase the pressure of the fluid in the brake pipe passage substantially as rapidly as the pressure of the fluid in the control reservoir is increased, a feed valve for supplying fluid at a uniform predetermined pressure from the supply passage to a control communication, and manually controlled means for supplying fluid at either one of a plurality of different predetermined rates from said control communication to said control reservoir.

7. In a portable device for testing the condition of the fluid pressure brake equipment on a vehicle, in combination, means having formed therein a brake pipe passage and a supply passage, the brake pipe passage being adapted to be connected to the brake pipe on a vehicle the brake equipment of which is to be tested, the supply passage being adapted to be connected to a source of fluid under pressure, a control reservoir associated with said means, a valve device responsive to the opposing pressures of the fluid in said control reservoir and of the fluid in said brake pipe passage, said valve device being operative on an increase in the pressure of the fluid in the control reservoir to supply fluid from the supply passage to the brake pipe passage to increase the pressure of the fluid in the brake pipe passage substantially as rapidly as the pressure of the fluid in the control reservoir is increased, said valve device being operative on a reduction in a pressure of the fluid in the control reservoir to release fluid from the brake pipe passage to reduce the pressure of the fluid in the brake pipe passage substantially as rapidly as the pressure of the fluid in the control reservoir is reduced, a feed valve for supplying fluid at a uniform predetermined pressure from the supply passage to a control communication, and manually controlled valve means for supplying fluid under pressure at either one of a plurality of different predetermined rates from said control communication to said control reservoir, and for also releasing fluid under pressure from said control reservoir at either one of a plurality of different predetermined rates.

8. In a portable device for testing the condition of the fluid pressure brake equipment on a vehicle, in combination, means having formed therein a brake pipe passage and a supply passage, the brake pipe passage being adapted to be connected to the brake pipe on a vehicle the brake equipment of which is to be tested, the supply passage being adapted to be connected to a source of fluid under pressure, a control reservoir associated with said means, a valve device responsive to the opposing pressures of the fluid in said control reservoir and of the fluid in said brake pipe passage, said valve device being operative on an increase in the pressure of the fluid in the control reservoir to supply fluid from the supply passage to the brake pipe passage to increase the pressure of the fluid in the brake pipe passage substantially as rapidly as the pressure of the fluid in the control reservoir is increased, said valve device being operative on a reduction in the pressure of the fluid in the control reservoir to release fluid from the brake pipe passage to reduce the pressure of the fluid in the brake pipe passage substantially as rapidly as the pressure of the fluid in the control reservoir is reduced, a feed valve for supplying fluid at a uniform predetermined pressure from the supply passage to a control communication, and manually controlled valve means for supplying fluid under pressure at either one of a plurality of different predetermined rates from said control communication to said control reservoir, and for also releasing fluid under pressure from said control reservoir at either one of a plurality of different predetermined rates, said manually controlled valve means being also operable to release fluid under pressure directly from the brake pipe passage.

CLYDE C. FARMER.